Figure 1:
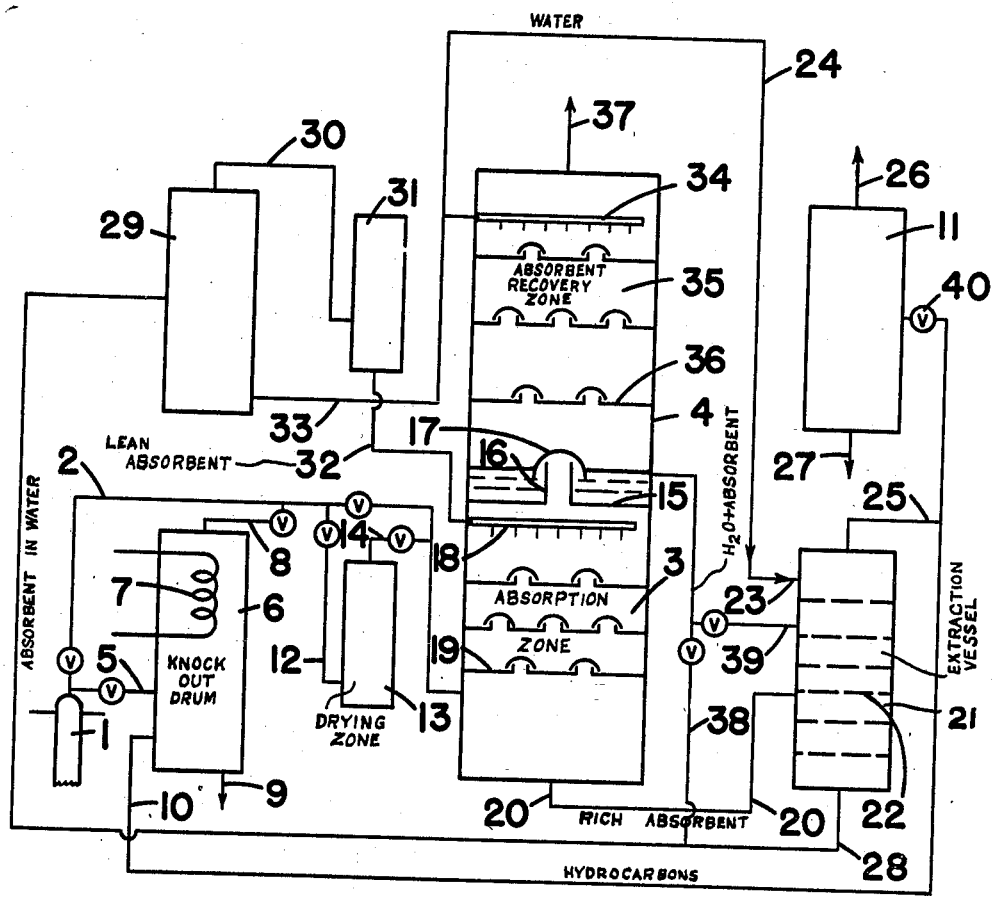

Sept. 28, 1943.  S. E. BUCKLEY  2,330,676
METHOD OF SEPARATING LIQUID FROM GAS
Filed Sept. 19, 1940

Stuart E. Buckley INVENTOR.
BY P. J. Whelan
ATTORNEY.

Patented Sept. 28, 1943

2,330,676

UNITED STATES PATENT OFFICE 2,330,676

METHOD OF SEPARATING LIQUID FROM GAS

Stuart E. Buckley, Houston, Tex., assignor to Standard Oil Development Company, a corporation of Delaware Application September 19, 1940, Serial No. 357,361

9 Claims. (Cl. 196—7)

The present invention is directed to a method for recovering natural gasoline from the effluent of a distillate well when the effluent is produced at high pressures of 1500 lbs./sq. in. and greater and it is desired to effect the recovery of the natural gasoline without materially reducing the pressure of the fixed gases, whereby the latter may be reintroduced into a reservoir.

For many years, much study and research have been devoted to the problem of recovering distillate from high pressure gas wells. As a result, two general methods have been followed, the first of which is based on the phenomenon of retrograde condensation, and the second of which utilizes an absorption medium. The absorption medium ordinarily employed is a hydrocarbon oil, preferably one having a boiling range coincident with or overlapping the boiling range of a distillate to be recovered from the gas. It is to the latter type of method that the present invention is directed.

Two difficulties, both arising from the fact that hydrocarbons become increasingly volatile at high pressure in the presence of a hydrocarbon gas, such as methane, are encountered in operating high pressure absorption type plants for recovery of distillate from natural gas. These difficulties are as follows:

(1) The abnormally high volatility of the intermediate hydrocarbons, such as butane, pentane and hexane, makes them difficult to absorb, requiring inordinately high oil circulation ratios for effective extraction from the gas.

(2) The conventional absorption oil, a hydrocarbon oil usually made from the recovered product, also becomes abnormally volatile whereby a part is lost by evaporation into the residue gas. The lighter or the lower the molecular weight of the absorber oil, the more serious are these losses by evaporation, while the heavier or the higher the molecular weight of the absorption oil, the greater the volume which must be circulated to effect the recovery of the desired constituents from the gas.

These difficulties make it expensive to attempt to operate an absorption type plant at a pressure exceeding 1500 lbs./sq. in., such as 3000 lbs./sq. in. and higher. Where natural gas is being produced from reservoirs at high pressure, for example, 3000 lbs./sq. in. or more, and it is necessary to return the stripped gas to the reservoir, after removal of the gasoline or distillate, any reduction of the pressure to accomplish absorption requires additional compression which is also expensive.

According to the present invention the aforesaid difficulties are partially or completely overcome by the utilization of an absorption medium which has a low molecular weight of the order of 30 to 100 in contrast to the higher molecular weight absorbents previously used, thereby reducing the oil circulation required for any degree of extraction, it being understood that the degree of absorption is a function of the molecular proportion between the absorber medium and the material being absorbed, and by avoiding prohibitive losses of absorption medium by evaporation into the residue gas by using as the absorption medium a material which is water-soluble and which therefore may be recovered from the residue gas by simple washing of the same with water.

The present invention was made possible by the discovery of the fact that low molecular weight hydrocarbon derivatives, having a water solubilizing constituent and particularly those containing an OH or an —O group, such as glycol, the lower alcohols, ketones, aldehydes, and the like, do not acquire the abnormal volatility in contact with high pressure natural or hydrocarbon gases which is characteristic of hydrocarbon oils. In referring to high pressure in connection with this phenomenon, pressures of the order of 1500 lbs./sq. in. and higher are contemplated. At the lower pressures, such as, for example, 600 to 1200 lbs./sq. in., in which range recovery by retrograde condensation is ordinarily effected, and in which range in the past absorption has ordinarily been carried out, these hydrocarbon derivatives containing OH or an —O group do not function even as well as hydrocarbon absorbents, such as butane and pentane, principally for the reason that they have a much lower solvent power for the hydrocarbons than do the hydrocarbon solvents. Furthermore, in this lower pressure range, the volatility characteristics of the respective absorbents in the presence of methane or other hydrocarbon gas are not markedly different. It is only when higher pressures are encountered, that is, pressures of 1500 lbs. or greater, that the striking dissimilarity between the volatility characteristics of hydrocarbons, such as butane, pentane, and the like, on the one hand, and derivatives, such as alcohols, ketones, and the like, on the other hand, becomes apparent and of importance in the solution of the problem of recovering distillates from natural gas at these high pressures.

As has been indicated, the solvents which are utilized according to the present invention are those hydrocarbon derivatives which are relatively low-boiling and which contain a water solubilizing group, such as an OH or an —O group. Another water solubilizing group is $NH_2$. It is not to be concluded, however, that all compounds falling in this group are of equal suitability. The compound must, of course, be either partly or completely miscible with or soluble in water at the temperature and pressure at which the absorption plant operates. Moreover, the absorbent must be liquid at the temperature and pressure existing in the absorption zone, and must be either completely or partly miscible with the hydrocarbons which it is desired to recover from the gas at the temperature and pressure at which the absorption zone is operated. Furthermore, it is preferable to use as low a molecular weight as possible so as to obtain the maximum molecular ratio of absorbent medium to material to be absorbed for a given plant capacity.

In selecting a solvent for use according to the present invention consideration must be given to the recovery of the solvent which, according to the present invention, may be effected by dissolving any evaporated solvent from the residue gas by washing with water and extracting the recovered distillate containing absorption medium with water. Accordingly, it is possible to use a material which is readily separable from water as by extraction or distillation.

For the preceding reasons, the preferred absorption media for the practice of the present invention are methyl alcohol and acetone. It is to be understood that the use of other media falling within the general classification heretofore defined is also contemplated where the disadvantages attending the use of these other media offer no obstacles. For example, aldehydes must be used with caution because of their tendency to polymerize under the conditions often encountered in these absorption plants. Phenol is expensive and has a high melting point which in some installations would give difficulties. Alcohols higher than methanol form azeotropic mixtures with water which render their separation from water a matter of some difficulty, although, of course, not an impossible procedure. What is sought to be emphasized is that, of all the members of the general group contemplated, methanol and acetone have properties which uniquely adapt them to the practice of the present invention.

The present invention includes features of novelty which are of particular importance in connection with the method as a whole and particularly in connection with the type of absorption medium employed. One of these resides in the recovery of the absorption medium from the recovered distillate. As has been previously indicated, this recovery may be effected by extracting the distillate with water. In one embodiment of the present invention, this extraction is carried out at the same pressure as that maintained in the absorption zone, and the separated oil with its dissolved gas is introduced in to a separator operating at the same high pressure, and the recovered gas is reintroduced into the absorption zone. By this expedient all the recovered gas is maintained at a pressure not substantially less than that of the formation pressure, whereby it may be reinjected into the ground without extensive recompression.

Another of these features is the correlation of the steps of the process by using water to wash the residue gas for the recovery therefrom of any evaporated absorption medium, and to use the water from this step also in the extraction of the recovered distillate, the water from the residue gas extraction being introduced into the latter extraction system between the point of entry of the absorption medium-free water and distillate rich in absorption medium. By this expedient, the amount of water which must be handled in the system is reduced.

Still another feature is the preliminary step of cooling the gas without a reduction of pressure and passing it through a scrubber or separator operating at the same pressure as the absorber prior to the entry of the wet gas to the absorber to remove therefrom any condensed water and hydrocarbon liquid. The purpose of this operation is to remove from the gas a substantial part of the water, which such gas always contains when it leaves the reservoir, and thus to reduce contamination of the absorption medium with water in the absorber. This is important because the addition of water to the absorption medium decreases its solvent power for hydrocarbons. A further purpose of this preliminary step is to remove from the gas a portion of the condensible hydrocarbons, crude oil or distillate, and thus reduce the amount which must be taken up by the absorption medium.

A further feature of the present invention resides in the introduction into a separator operated at a pressure between 500 and 1000 lbs./sq. in. both the hydrocarbons condensed in the preliminary step just described, and the hydrocarbons recovered from the absorption medium by extraction of the medium with water. It has been found that the condensed hydrocarbons removed from the gas in the preliminary separation is substantially heavier than the hydrocarbons absorbed in the absorption medium, and that the introduction of these heavier hydrocarbons into the separator with the absorbed hydrocarbons will promote condensation of the liquid constituents of the latter.

Figure 2:
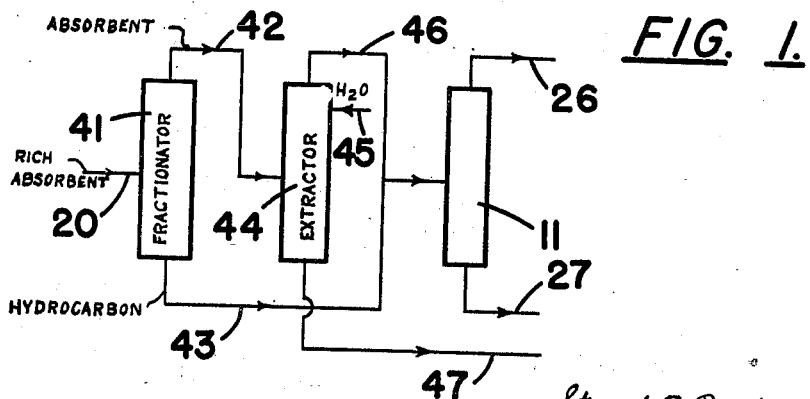

Further objects and advantages of the present invention will appear from the following detailed description of the accompanying drawing in which Fig. 1 is a front elevation in diagrammatic form, and partly in section, of a plant suitable for the practice of the method of the present invention, and Fig. 2 is a similar view of the preferred embodiment of the system for recovering the absorption medium from the hydrocarbons.

Referring to the drawing in detail, numeral 1 designates an oil well having at its upper end an outlet 2 for gas carrying distillate. The line 2 discharges into an absorption chamber 3 which forms the lower portion of a vessel 4. The line 2 is provided with a branch line 5 which discharges into a chamber 6 provided with a cooling coil 7 and having an outlet 8 at its upper end which forms a return line to line 2. These lines are provided with suitable valves so that, if desired, the fresh feed can be routed through the chamber 6 for the purpose of reducing the temperature of the gas to knock out readily condensible hydrocarbons and water. The chamber 6 is provided with a drawoff line 9 for water and a drawoff line 10 for hydrocarbons which discharges into a separator 11 referred to hereinafter. In practically every instance, passage of the gas through chamber 6 will be necessary.

Line 2 is provided with a second branch line 12 which discharges into a chamber 13 which is suitably packed with a drying agent, or through which may be passed a drying liquid, such as ethylene glycol, countercurrent to the gas, and which is provided at its upper end with an outlet 14 which returns to line 2. Again, these lines are provided with suitable valves so that, if desired, the fresh feed can be passed through the drying zone 13 in the event that sufficient drying is not effected in the chamber 6.

Vessel 4 is provided at a point intermediate its ends with a partition 15 which has a central standpipe 16 covered with a cap 17 of such dimensions that the lower periphery of the cap extends below a liquid level maintained on the partition 15 whereby gases coming out from zone 3 can pass into the upper portion of vessel 4. In the upper end of zone 3 is arranged a spray nozzle 18 into which is fed the absorption medium. The zone is provided with suitable interior equipment, such as trays 19 provided with bubble caps, to insure proper contact of the gases with the absorption medium.

At the lower end of zone 3 is an outlet 20 for the absorption medium with its absorbed constituents and this line 20 discharges into an extraction vessel 21 at a point intermediate the ends thereof. Vessel 21 is provided with suitable internal equipment 22, such as perforated trays, to insure thorough mixing of the absorption medium with the extraction agent, which in this case is water which is introduced into the top of vessel 21 through inlet line 23. This water may be introduced fresh into the system or may be water recovered from a step to be described hereinafter, and introduced into inlet 23 through line 24. At the top of vessel 21 is an outlet pipe 25 for the liberated hydrocarbons which discharge into separator 11. The separator 11 is provided at its upper end with an outlet 26 for gas and at its lower end with an outlet 27 for oil which in the usual course of events is then conducted to a stabilizer.

The extraction vessel 21 is provided at its lower end with an outlet line 28 for water containing the absorption medium. Line 28 discharges into a fractionator 29, from the upper part of which vapors of the absorption medium leave through line 30 and are conducted to a condenser 31 from which the liquid absorption medium is conducted by line 32 to the spray nozzle 18. Water leaves the fractionator 29 from the bottom thereof through line 33 and is conducted thereby to a spray nozzle 34 arranged in the upper part of upper zone 35 of vessel 4. Line 24 is a branch of line 33 and serves to conduct part of the water to the extraction vessel 21.

Zone 35 is provided with internal equipment 36, such as perforated plates carrying bubble caps which serves to effect a thorough scrubbing of the gas with water. The dry gas leaves the top of this zone through line 37, and the water is withdrawn from the bottom thereof through line 38 which empties into line 28. Line 38 has a branch line 39 which, by suitable manipulation of the valves shown can be used to direct all or part of the water from zone 35 into zone 21.

If it be assumed that the gas leaves the well 1 under a pressure of 3000 lbs./sq. in. and at a temperature of about 90°–130° F., the absorption chamber 3 may be operated at a pressure of about 3000 pounds per square inch and at a temperature of about 80°–100° F. Under these conditions, acetone serves admirably as the absorption medium. Depending upon the conditions employed, other absorption media, such as low boiling alcohols, amines, ketones, aldehydes or phenols, may be utilized. All of these substances are characterized by the property of having relatively low volatility at pressures above 1500 lbs./sq. in. in the presence of methane.

When the gas is bypassed through the knockout chamber 6, this chamber will be held at a temperature of about 80°–100° F. When the drying zone 13 is used, it is preferred that it be packed with a solid dehydrating agent, such as calcium chloride or any of the other commonly known solid dehydrating agents.

It will be understood that temperature regulators may be interposed where desired in the system shown. For example, between the plates in absorption zone 3 it may be desirable to use cooling coils to take up the heat of absorption generated in the zone, so that the temperature may be maintained substantially constant. Likewise, line 20 may be provided with a heating coil or a cooling coil, as desired, so as to maintain in the extraction zone 21 the desired temperature which will be selected as that temperature at which distribution of the absorption medium in the water and the oil will favor its removal in the water phase. In the case of acetone, this temperature will ordinarily be within the range of 40° F. to 100° F. Likewise, a heating coil may be interposed in line 25 and also in the bottom of separator 11, so as to insure separation of the desired constituents from the liquid.

In the system shown there need be no pressure reduction except that which represents the normal pressure drop to be expected by the passage of the gas through the system. Thus, the dry gas leaving the system through lines 26 and 37 may be at a pressure not more than a few hundred pounds below the well pressure and may be readily compressed to reinjection pressure without much compression expense.

Since the bulk of the gas will leave the system through line 37, it is preferred to operate the separator at a pressure at which constituents of the absorbed hydrocarbons, such as pentane and hexane, have their minimum volatility. It has been found that a pressure within the range of 500 to 1000 lbs./sq. in. is best suited for the purpose. To this end an expansion valve 40 is provided in line 25 just ahead of separator 11. The expansion of the gases and liquids to this lower pressure results in a much higher recovery of the liquid hydrocarbons with a consequent smaller loss of these hydrocarbons in the gas discharged through line 26. As a result, this gas may not be further processed for the recovery therefrom of liquid hydrocarbons, but can be directed without further processing to industrial uses. With the separator operating at a temperature of about 33° F. a pressure between 500 to 800 lbs./sq. in. is desirable, while at a temperature of about 100° F. a pressure between 800 to 1000 pounds per square inch is more satisfactory.

The above described embodiment of the present invention is simply one form which the apparatus may take. Obviously, many changes may be made in the flow plan without departing from the basic principles of the method. For example, the water circuit for the zone 35 and the water circuit for the extraction zone 21 may be made entirely separate. Likewise, zones 3 and 35 may be independent chambers. Again, while the recovery of the solvent from the water is shown to be accomplished by distillation, it will be apparent that this recovery made be effected by extraction, if desired. Variations of this nature are contemplated within the scope of the present invention.

In Fig. 2 is shown a preferred arrangement for the recovery of absorption medium from the absorbed hydrocarbons. In this figure, numeral 20 designates the line leaving the bottom of absorption zone 3. Line 20 in this case discharges into intermediate point of a fractionator 41, which is so operated that acetone vapors go off overhead through line 42. It will be apparent that some of the lighter hydrocarbons will always be in the overhead. The heavier hydrocarbons leave the bottom of the fractionator through line 43 and are conducted directly to separator 11. The overhead is introduced into a second fractionator 44 at an intermediate point thereof. Water is introduced into this fractionator near the top thereof through line 45. In this case, the water acts as a vapor pressure depressant and serves to hold back the acetone while permitting the hydrocarbons to pass off overhead through line 46, by which they are conducted to the separator 11. The water and acetone leave the bottom of fractionator 4 through line 47, which corresponds to line 28 of Fig. 1.

It will be seen that in this embodiment only a small amount of hydrocarbons is contacted with the water. This eliminates emulsion troubles whereby the troublesome operation of settling is avoided. Furthermore, less water is required in the system. In addition, there is a more complete recovery of the absorption medium from the oil, since the factor of the solubility of the absorption medium in the oil is eliminated.

In the foregoing discussion reference has been made to the operation of the absorption step substantially under well-head pressure. This, of course, is desirable where it is desired to reinject the recovered dry gas into the reservoir. Where the well-head pressure is extremely high, however, the relation between the cost of compression from an intermediate pressure to well-head pressure, and the loss of hydrocarbons into residue gas, may be such that economical operation will dictate the operation of the absorption zone at a pressure substantially below well-head pressure. It is to be borne in mind that the volatility of the hydrocarbons increases with pressure, so that when the absorption is conducted at pressures in excess of, say, about 3,000 lbs./sq. in., there will be a considerable loss of hydrocarbons into residue gas, regardless of the absorption medium which may be employed. Thus, if well-head pressure is about 5,000 lbs./sq. in., it will be desirable to operate the absorption zone at a pressure between 2,000 and 3,000 lbs./sq. in. for the reason that the cost of re-compressing the residue gas from this operating pressure back to 5,000 lbs./sq. in. will be less than the loss incurred by evaporation of the hydrocarbons into the residue gas, if the absorption is conducted at 5,000 lbs./sq. in.

Thus, it will be clear that, according to the present invention, absorption is carried out at well-head pressure only when this operation is economical from the point of view expressed above, with the understanding, however, that absorption is aways carried out at a pressure in excess of 1,500 lb./sq. in. In general, it may be said that the maintenance of the absorption zone at a pressure above about 3,000 lb./sq. in. will be avoided.

It will be understood that the apparatus shown in the drawing is for the purpose of illustration only, for which reason it is diagrammatic in form, and does not purport to describe the best form which the apparatus may take. For example, the internal equipment in the vaporization and extraction zones is of the most elementary nature and is undoubtedly not the best equipment that could be used. It was purposely used for the illustration because of simplicity and because it does convey the thought that some device is used in these vessels to insure the intimate dispersion of one liquid in another. Thus, for example, spray nozzles such as 18 and 34 would not be used in practice, but they serve as simple expedients for conveying the idea of countercurrent flow in zones 3 and 35.

The nature and objects of the present invention having been thus described and illustrated, what is claimed as new and useful and is desired to be secured by Letters Patent is:

1. A method for recovering distillate from natural gas contained in same at pressures in excess of 1,500 lbs./sq. in., which comprises passing the gas, while maintaining it at a pressure of above 1,500 lbs./sq. in., into contact with a liquid hydrocarbon derivative containing a group capable of solubilizing the hydrocarbon in water, said derivative being soluble in oil and water.

2. A method for recovering distillate from natural gas containing the same at pressures in excess of 1,500 lbs./sq. in. which comprises passing the gas, while maintaining it at a pressure of above 1,500 lbs./sq. in., into contact with a liquid hydrocarbon derivative, miscible with oil and water, and containing a solubilizing group comprising oxygen.

3. A method according to claim 2 in which the liquid hydrocarbon derivative is a low boiling aliphatic alcohol.

4. A method according to claim 2 in which the low-boiling hydrocarbon derivative is methanol.

5. A method according to claim 2 in which the liquid hydrocarbon derivative is a low-boiling ketone.

6. A method according to claim 2 in which the liquid hydrocarbon derivative is acetone.

7. A method for recovering distillate from natural gas containing the same at pressures in excess of 1,500 lbs./sq. in., which comprises passing the gas, while maintaining it at a pressure of above 1,500 lbs./sq. in. countercurrent to, and in intimate contact with, a liquid hydrocarbon derivative miscible with oil and water, and containing a solubilizing group, comprising oxygen in an absorption zone, withdrawing the stripped gas and absorbed constituents separately from said zone, washing the stripped gas with water, recovering the aforesaid liquid hydrocarbon derivative from said wash water, and returning it to said zone.

8. A method for recovering distillate from natural gas containing same at pressures in excess of 1,500 lbs./sq. in., which comprises passing the gas into an absorption zone maintained at a pressure of above 1,500 lbs./sq. in. in countercurrent relation to a liquid absorption medium comprising a hydrocarbon derivative miscible with oil and water, and containing a solubilizing group comprising oxygen, removing stripped gas and absorption medium containing distillate separately from said zone, separating the absorbed hydrocarbons from the absorption medium by dissolving the latter in water, recovering absorption medium from the stripped gas by washing the latter with water, combining the water solutions of the absorption medium, separating the absorption medium from the water, and returning the absorption medium to the absorption zone.

9. A method according to claim 1 in which the gas is subjected to a treatment for the removal of water therefrom before being contacted with the liquid hydrocarbon derivative.

STUART E. BUCKLEY.